United States Patent
Shenoy et al.

(10) Patent No.: US 10,985,933 B1
(45) Date of Patent: Apr. 20, 2021

(54) DISTRIBUTED PUSH NOTIFICATIONS FOR DEVICES IN A SUBNET

(71) Applicant: VMWARE, INC., Palo Alto, CA (US)

(72) Inventors: Pranav Ashok Shenoy, Bangalore (IN); Sanjay Patil, Atlanta, GA (US); Shanti Kamichetty, Bangalore (IN); Shiva Tripathi, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/813,772

(22) Filed: Mar. 10, 2020

(30) Foreign Application Priority Data

Jan. 24, 2020 (IN) .............................. 202041003206

(51) Int. Cl.
*G06F 15/16* (2006.01)
*H04L 12/18* (2006.01)
*H04L 29/08* (2006.01)
*H04L 29/12* (2006.01)

(52) U.S. Cl.
CPC ...... *H04L 12/1895* (2013.01); *H04L 67/1093* (2013.01); *H04L 67/26* (2013.01); *H04L 61/6068* (2013.01)

(58) Field of Classification Search
CPC . H04L 12/1985; H04L 67/1093; H04L 67/26; H04L 61/6068
USPC .................................................. 709/204, 206
See application file for complete search history.

(56) References Cited

U.S. PATENT DOCUMENTS

| | | | |
|---|---|---|---|
| 2013/0096696 A1* | 4/2013 | Porsch ................ | G06F 11/2028 700/3 |
| 2013/0143527 A1* | 6/2013 | Randazzo ......... | H04M 1/72577 455/411 |
| 2014/0256449 A1* | 9/2014 | Chatani ................... | H04L 67/24 463/42 |
| 2015/0372717 A1* | 12/2015 | Schrum, Jr. ............. | H04L 5/003 370/458 |
| 2016/0259836 A1* | 9/2016 | Heathorn .............. | G06F 16/273 |
| 2017/0310742 A1* | 10/2017 | Jain ......................... | H04L 67/34 |

\* cited by examiner

*Primary Examiner* — Liang Che A Wang
(74) *Attorney, Agent, or Firm* — Thomas | Horstemeyer LLP (57) ABSTRACT

A distributed notification system is described herein. A distributed notification grouping can be created in which a master device is appointed for a subnet. The master device can poll a server periodically on behalf of peer or slave devices so that the peer or slave devices do not poll the server unless they are appointed as the master or are retrieving notification data from the server.

16 Claims, 8 Drawing Sheets

DISTRIBUTED PUSH NOTIFICATIONS FOR DEVICES IN A SUBNET

RELATED APPLICATIONS

Benefit is claimed under 35 U.S.C. 119(a)-(d) to Foreign Application Serial No. 202041003206 filed in India entitled "DISTRIBUTED PUSH NOTIFICATIONS FOR DEVICES IN A SUBNET" on Jan. 24, 2020, by VMWARE, Inc., which is herein incorporated in its entirety by reference for all purposes.

BACKGROUND

To reduce the cost of purchasing client devices and corresponding service charges, an enterprise may allow employees to utilize personal client devices under a "bring your own device" (BYOD) policy to access enterprise resources, such as electronic mail, contacts, and calendar data. Within the enterprise setting, client device administrators configure client devices to gain access to such resources, thereby allowing employees to remain highly productive regardless of whether the employees are on premises at the enterprise facility.

Information technology (IT) administrators might require that users enroll their devices as managed device with a remotely executed management service. Once enrolled, a managed device can receive notifications from the management service to receive management commands and other data. For example, management commands can cause applications, settings, or profiles to be installed on the client device. Push notifications are often implemented through a polling methodology. In other words, a client device actually polls the server (e.g. a management service) on a periodic basis and retrieves a notification when one is available. In this scenario, a push notification seems instantaneous, but the push framework is actually implemented through repeated polling of the server. As the population of devices that is managed by the management service increases, repeated polling can introduce resource bottlenecks on the server.

BRIEF DESCRIPTION OF THE DRAWINGS

Various aspects of the present disclosure can be better understood with reference to the following drawings. The components in the drawings are not necessarily to scale. Emphasis is placed upon clearly illustrating various features of the present disclosure. Moreover, in the drawings, like reference numerals designate corresponding parts throughout the several views.

DETAILED DESCRIPTION

Users in an enterprise environment can be granted access by information technology (IT) administrators to enterprise resources, such as mail, files, and other resources. Users can utilize their own devices or devices issued by the enterprise to access company resources. Administrators might require that enterprise issued devices or devices brought by the user be enrolled as managed devices with a management service.

A management service can be run on a server or group of servers that are remote from the users' devices. The management service can allow administrators to manage users' devices to a certain degree. The management service, working in conjunction with a management component running on the users' devices, can install applications, profiles, settings, and make changes and adjustments to the user's devices. To accomplish management of user devices, the management service can send push notification to enrolled client devices.

A push notification framework that allows a remotely executed server to communicate with client devices can be accomplished in various ways. In some examples, a polling methodology can be utilized whereby a client device polls a server on a periodic or near-constant basis. In other examples, a persistent connection can be maintained between a client device and a notification server for the purpose of exchanging communications, including push notifications, between the two devices. In other scenarios, a notification application programming interface (API) provided by an operating system can perform notifications on behalf of applications running on the device and servers that communicate with those applications.

Sending notifications to client devices can require significant resources to be utilized by a server. In the case of periodic or near-constant polling from client devices so that notifications are near-instantaneous, the server would have to service many network requests from each client device to which it is providing notifications. In the case of a persistent communications channel, the server is required to maintain a persistent connection for each device to which it sends notifications. Either scenario requires computing and networking resources.

Therefore, examples of the disclosure can provide a distributed notifications framework that reduces the impact on a server providing notifications. The computing and network load can be distributed to client devices that are receiving network by subnetwork, or subnet. One or more client devices on a subnet can be appointed as a master device, and the master device can communicate with other devices on the same subnet that are not the master, referred to as peer devices, to provide an indication that they have notifications from the server. The peer devices can suppress polling the notification server and instead communicate with the master devices instead of a notification server, such as the management service. In this way, the peer devices on the subnet can avoid polling the server or maintaining a persistent connection with the server, which can reduce the computing and networking resources on the server.

Figure 1:
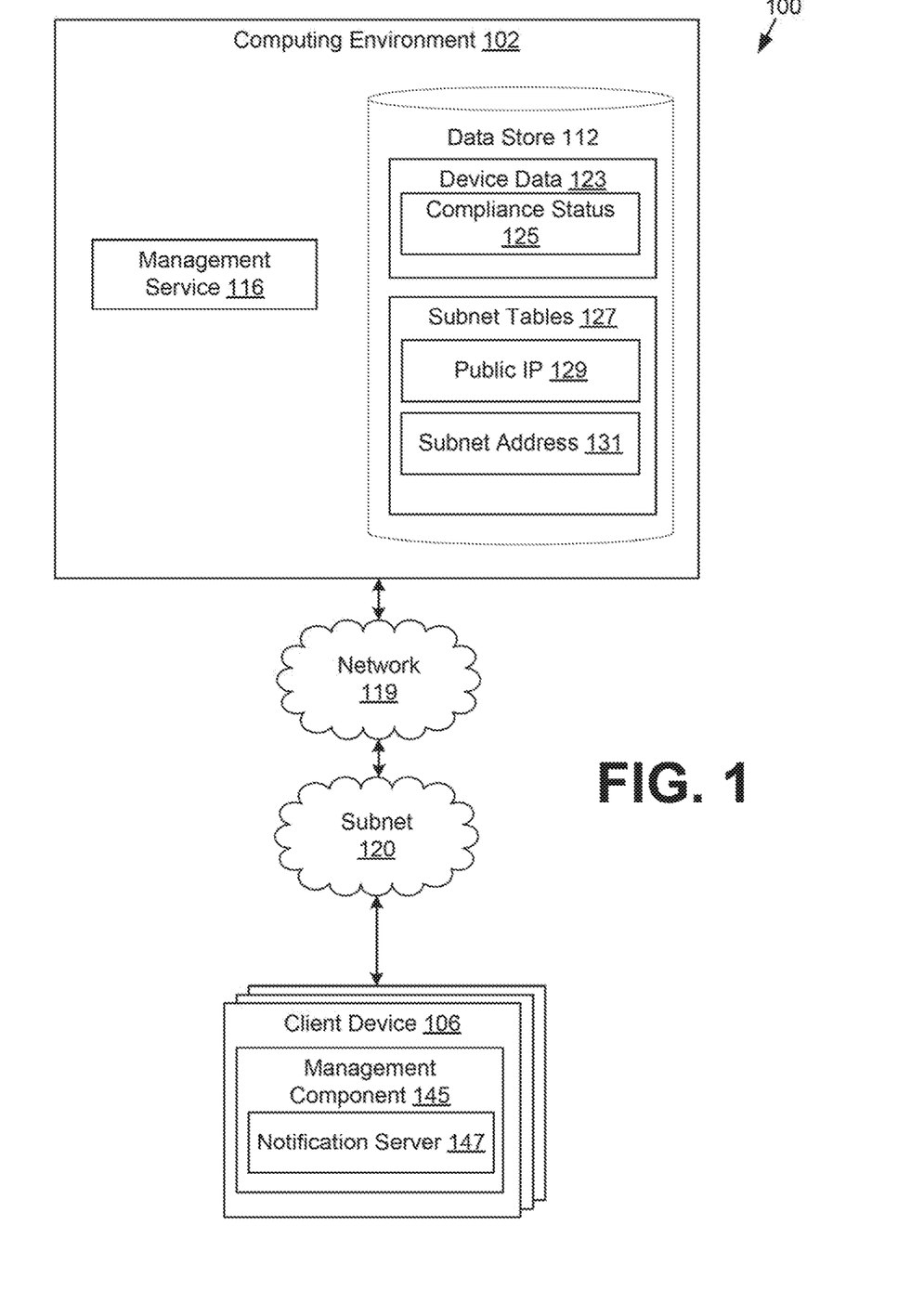
FIG. 1 is a block diagram of a networked environment according to examples of the disclosure.

FIG. 1 depicts a networked environment 100 that includes a computing environment 102 and one or more client devices 106, which can be in communication over a network 119. The client devices 106 can be devices to which the computing environment 102 sends push notifications, such as devices that are managed by a management service 116 running on the computing environment 102. The network 119 can include, for example, the Internet, one or more intranets, extranets, wide area networks (WANs), local area networks (LANs), wired networks, wireless networks, other suitable networks, or any combination of two or more such networks. For example, the networks can include satellite networks, cable networks. Ethernet networks, and other types of networks.

The client devices 106 can also be connected to one or more subnets 120. Although a single subnet 120 is depicted, there can be various subnets to which client devices 106 are connected. A subnet 120 represents a part of a network to which the client devices 106 are connected. A subnet 120 also represents a grouping of client devices 106 that have the same IP address prefix, which is referred to as a subnet address herein. On a subnet 120, a client device 106 can be assigned a local IP address, which is an IP address that is internal to the subnet 120 and can only be used within the subnet 120 or a portion thereof. Additionally, a client device 106 can be associated with a public IP address, which can be shared amongst multiple client devices 106 on the subnet. For example, by utilizing network address translation (NAT), the client devices 106 can share a single public IP address and have different local or internal IP addresses.

The computing environment 102 can comprise, for example, a server computer or any other system providing computing capability. Alternatively, the computing environment 102 can employ a plurality of computing devices that can be arranged in one or more server banks, computer banks or other arrangements. The computing devices can be in a single installation or can be distributed among different geographical locations. For example, the computing environment 102 can include a plurality of computing devices that can collectively comprise a hosted computing resource, a grid computing resource and/or any other distributed computing arrangement. In some cases, the computing environment 102 can correspond to an elastic computing resource where the allotted capacity of processing, network, storage, or other computing-related resources can vary over time. The computing environment 102 can also include or correspond to one or more virtualized server instances that are created to execute the functionality that is described herein.

Various applications or other functionality can be executed in the enterprise computing environment 103. Also, various data can be stored in a data store 112 that can be accessible to the enterprise computing environment 103. The data store 112 can be representative of a plurality of data stores 112. The data stored in the data store 112 can be associated with the operation of the various applications or functional entities described below.

The components executed on the enterprise computing environment 103 can include a management service 116 and other applications, services, processes, systems, engines, or functionality not discussed in detail herein. The management service 116 can monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116.

In the context of this disclosure, the management service 116 can also be a notification server that sends notifications to client devices 106 for any purpose. However, the distributed notifications framework is discussed herein in the context of a population of devices that are managed by the management service 116.

The management service 116 can include a management console that can allow administrators to manage client devices 106 that are enrolled with the management service 116. User interfaces can allow an administrator to define policies for a user account or devices associated with an enterprise environment. The user interfaces can also include, for example, presentations of statistics or other information regarding the client devices 106 that can be managed by the management service 116.

The data stored in the data store 112 can include device data 123, subnet tables 127, and potentially other data. Device data 123 can include records to client devices 106 that are enrolled as managed devices with the management service 116. A record within device data 123 can include various security settings selected for enforcement on a client device 106 that is enrolled with the management service 116. Accordingly, a device record can include a device identifier associated with a device, such as the client device 106, one or more device certificates, and a compliance status 125. In some examples, device data 123 can also identify a user associated with a client device 106. A device record can also store other device specific information, such as a device type, operating system type or version, applications that are required or optional for the device, or an enrollment status of the device. In this scenario, the device data 123 can also indicate whether a managed device is a computing device or a peripheral device, such as a printer, scanner, or other device that can be deployed in an environment and associated with a record in a directory service.

Various compliance rules can be enforced on client devices 106 that are enrolled as managed devices with the management service 116. For example, a compliance rule can specify that a client device 106 is required to be off or in a low power "sleep" state during a specified time period. Another compliance rule can specify that a client device 106 is required to be on or in a normal operation "awake" state during a specified time period. As another example, a compliance rule can specify that a client device 106 is prohibited from rendering content that has been designated as confidential.

Subnet tables 127 can include one or more tables or other data structures that track information about client devices 106 to which the management service 116 sends notifications. The subnet tables 127 can facilitate a distributed notification system. The subnet tables 127 can include a hash table or other structure that is keyed by a public IP 129 and a subnet address 131 of the subnet 120 to which a grouping of client devices 106 is connected. The subnet address 131 can be a subnet mask that identifies a subnet. The public IP 129 can be an external address that a grouping of client devices 106 connected to a subnet 120 share. Accordingly, for each combination of a public IP 129 and a subnet address 131, the management service 116 can create a grouping of client devices 106 to form a distributed notification grouping. A distributed notification grouping can be assigned a master device that can communicate with the management service 116 on behalf of other client devices 106, or peer devices, that is in the grouping.

Accordingly, the subnet tables 127 store various information about client devices 106 and their respective groupings. The subnet tables 127 can store a local IP address, or an IP address on the subnet 120 of a client device 106. The subnet tables 127 can also store a public IP address of the client device, and a device identifier of the client device 106. The subnet tables 127 can also identify one of the client devices 106 in a grouping as the master client device 106. The remaining client devices 106 are slave or peer client devices. The master client device 106 can poll the management service 116 on a periodic basis or maintain a persistent connection with the management service 116 to receive notifications, such as commands from the management service 116.

The master client device 106 can also receive an indication that a peer client device 106 in the grouping has a notification waiting for it in the management service 116. The master client device 106 can send a command instructing the peer client device 106 to perform a check-in with the management service 116 to retrieve its notification. In this way, peer client devices 106 only need to poll the management service 116 when a notification is waiting for the device in the management service 116.

The client device 106 can be a processor-based system such as a desktop computer, a laptop computer, a smartphone, a tablet computer system, and so on. The client device 106 includes a display that comprises, for example, one or more devices such as liquid crystal display (LCD) displays or other types of display devices. The client device 106 is equipped with networking capability or networking interfaces, including a localized networking or communication capability, thereby allowing the client device 106 to communicate with the computing environment 102 over the subnet 120 and the network 119.

The client device 106 executes various applications, such as a management component 145. The management component 145 can communicate with the management service 116 and manage the client device 106 on behalf of the management service 116. The management component 145 can provide visibility with respect to the operation status of the client device 106 and can be installed with elevated privileges on the client device 106 to facilitate management of the device. The client device 106 can be provisioned by the management service 116 by causing resources to be installed or stored on the client device 106 using the command queue maintained by the management service 116. The management service 116 can therefore permit or deny various services to the client device 106.

Once a client device 106 has been remotely provisioned and enrolled by the IT administrator, the activities of the client device 106 can be tracked by the management service 116. Compliance rules can also be stored on the client device 106, where the management component 145 reports any violations of compliance rules to the computing environment 102. The management component 145 can also receive commands from the management service 116 through the distributed notifications framework to install applications, profiles or other data on the device or carry out any other management commands on the device. Additionally, the management component 145 can receive informational notifications on the client device 106 that are displayed on a display of the device.

The management component 145 can also have a notification server 147, which represents a server process that can be executed on the client device 106. The notification server 147 can be executed by client devices 106 that are not appointed as a master client device 106 for a subnet 120. The notification server 147 can listen on a port and local IP of the client device 106 for a command from an appointed master device to request a notification from the management service 116.

The management component 145 can be instructed to perform a check-in with the management service 116 upon startup or when any network change is detected in the client device 106. A network change can be a change in IP address or any other change in connectivity status. When a network change occurs, this can be an indication that the subnet 120 or network 119 to which the client device 106 is connected may have changed. The check-in can comprise a request that includes various data. The data can include a local IP address of the client device 106, a public IP address of the client device 106, a subnet address or subnet mask of the subnet 120 to which the client device 106 is connected, and a device identifier.

The management service 116 can respond to the check-in by either appointing the client device 106 on which the management component 145 is running as the master device or providing information about a previously appointed master device that is acting as the current master on the subnet 120 of the client device 106. The management service 116 can determine that a master has already been appointed on the subnet 120 because the subnet tables 127 identify a subnet 120 by a public IP 129 as well as a subnet address 131.

Figure 2:
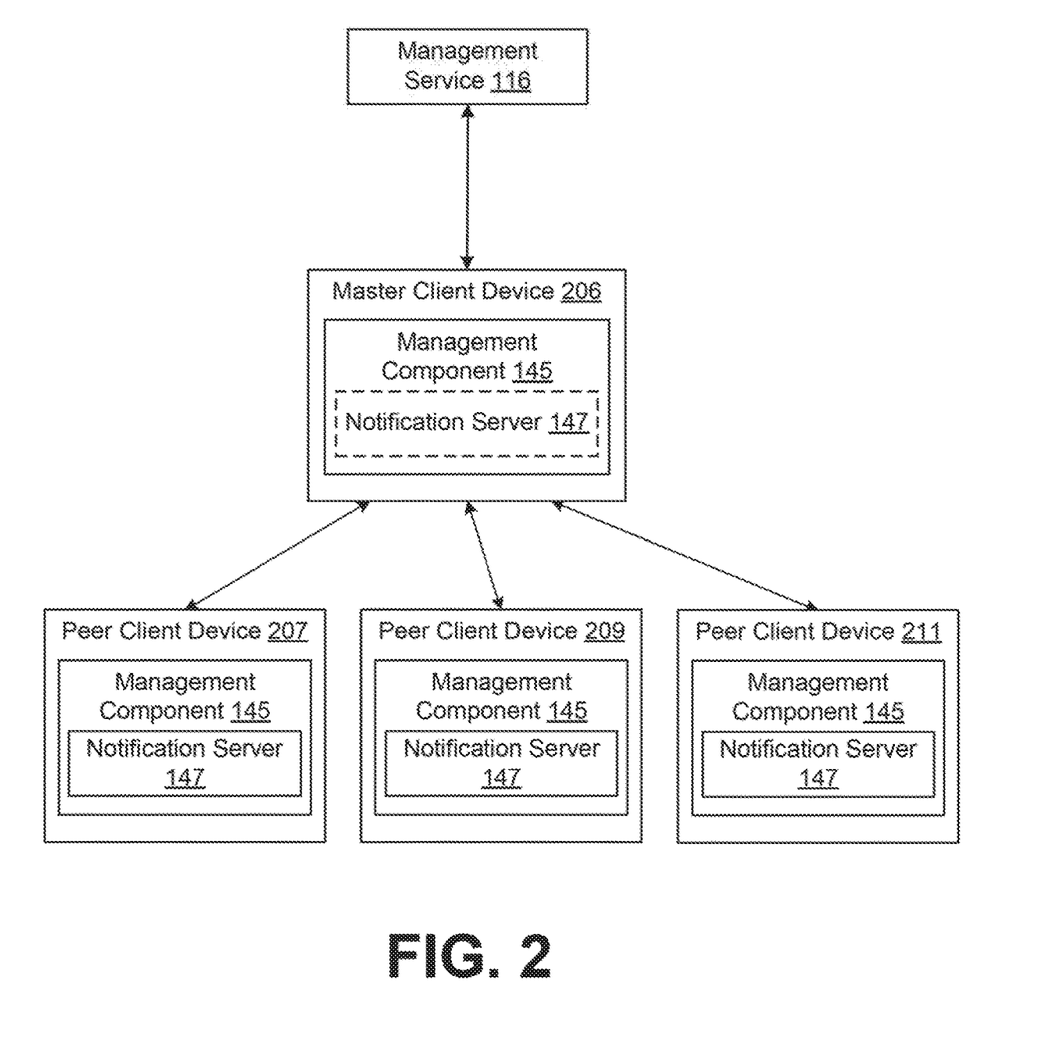
FIG. 2 is a block diagram illustrating an example scenario according to examples of the disclosure.

Reference is now made to FIG. 2, which illustrates how a distribute notifications grouping according to the disclosure can be implemented. In the scenario shown in FIG. 2, the management service 116 has created a grouping that includes a master client device 206, and peer client devices 207, 209, and 211. The depicted client devices 106 can be in communication with the management service 116 over a network 119 and share a public IP address. The client devices 106 can also be connected to a subnet 120 and communicate with one another uses their local IP addresses on the subnet 120.

As noted above, a client device 106, upon startup or upon detecting a network change, can perform a check-in with the management service 116. The management service 116 can initially appoint a master for a subnet 120 if the checking-in client device 106 is the first client device 106 that has performed a check-in from that subnet 120 that provides a public IP address and a subnet address. The management service 116 can respond to the check-in of the first client device 106 with a command to act as the master for the subnet 120 to which the client device 106 is connected. In the depicted scenario, the master device is client device 206. The client device 206 can suppress the notification server 147 in the management component 145 running thereon if it is acting as the master.

Accordingly, client device 206 can periodically poll the management service 116 for notifications for itself. If or when a second client device, such as client device 207, joins the subnet 120, client device 207 can perform a check-in with the management service 116. The management service 116 can respond to the client device 207 with an indication to act as a peer or slave device for the subnet 120. The management service 116 can also provide a local IP address on the subnet 120 for the master device. By acting as a peer device, the client device 207 can suppress its polling of the management service 116 to reduce the network and computing load on the management service 116. Instead, the client device 207 can start the notification server 147 and listen for communications from the master client device 207.

Also, in response to the check-in by the client device 207, the management service can provide a seed value for a random number generator. The management component 145 can generate a random polling interval using the seed value. The management component 145 can ping or check-in with the master client device 206 according to the polling interval to ensure that the master client device 206 is still on the network and still acting as the master. The management service 116 can also generate and provide the polling interval from a random or pseudorandom number to the client device 207. In one example, by randomly generating the polling interval, the various peer client devices 106 on the subnet 120 can vary the interval with which they ping the master to lessen the network and computing strain imposed on the client devices 106.

Accordingly, as other client devices 106, such as client device 209 and 211, join the subnet 120, they can also be provided with an indication to act as a peer or slave device and execute the notification server 147. Thereafter, when the management service 116 generates a notification for a peer device, such as client devices 207, 209, and 211, the management service 116 can provide the notification or a command for the client device to perform a check-in. The notification or command can be provided with the local IP address of the client device 106 for which the notification is intended.

The master client device 206, or the management component 145 running on the master client device 206, can then provide the notification or the command to perform a check-in with the management service 116 to the notification server 147 at the local IP address of the client device 106 for which the notification is intended, such as client device 207. Once the notification server 147 receives the command to perform a check-in with the management service 116 or the notification data itself, the management component 145 can act on the command or notification. In the case of a command to perform a check-in, the management component 145 can communicate directly with the management service 116 to obtain the notification to which it was alerted by the master.

Client devices 209 and 211 can also act as peer or slave devices and obtain notifications or an indication of notifications from the master client device 206. Accordingly, only the master client device 206 should poll the management service 116 among the client devices 106 in the subnet 120 that are enrolled with the management service 116 or configured to receive notifications from the management service 116.

Figure 3:
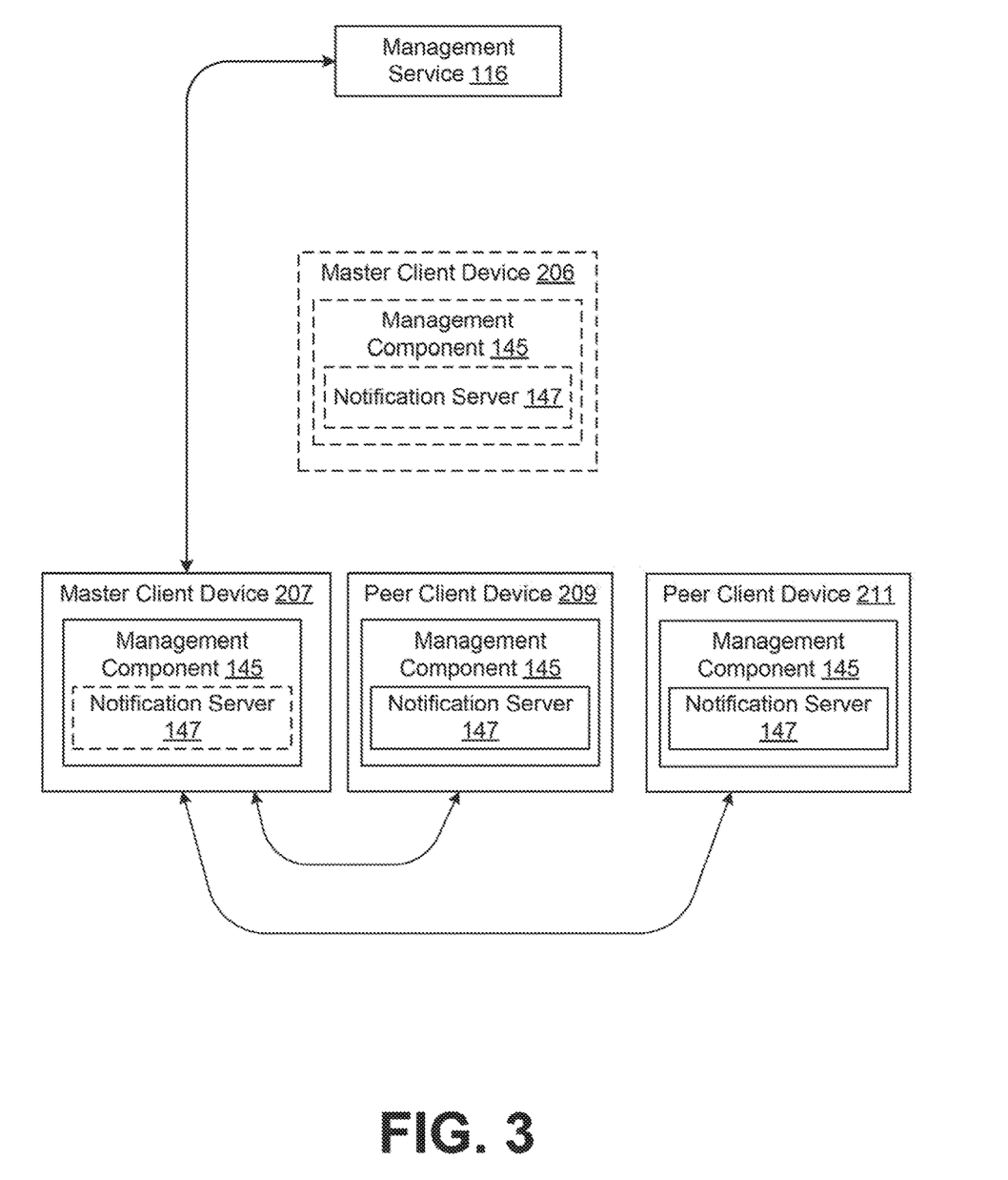
FIG. 3 is a block diagram illustrating an example scenario according to examples of the disclosure.

Continuing the example of FIG. 2, reference is now made to FIG. 3. In the scenario shown in FIG. 2, the client device 206 was appointed as the master device for the subnet 120. However, the client device 206 may leave the subnet 120 after a period of time. The client device 106 may crash, shut down, or simply move to a different location and connect to a different subnet 120. Therefore, a new master device needs to be appointed by the management service 116 for the subnet 120.

As noted above, the peer client devices 207, 209, and 211 are configured with respective polling frequencies that can vary from another. The peer client devices 207, 209, and 211 can poll the previous master client device 206 at its local IP address according to their respective polling frequencies to test whether the device is still a member of the subnet 120. The first client device 106 polls the previous master client device 206 after the device has left the subnet 120 and determines that the device is no longer responsive can then communicate with the management service 116 and request to be appointed as the new master device for the subnet 120.

Accordingly, after requesting to be appointed the new master device, the management service 116 can update the subnet table 127 corresponding to the public IP 129 and subnet address 131 of the subnet 120 to reflect that a new master device has been appointed. In the example of FIG. 3, this new master device is client device 207. The management service 116 can respond to the client device 207 with a confirmation that it has been appointed as the new master device.

The remaining client devices 209 and 211 can be updated with the information that a new master device has been appointed in various ways. In one example, the management service 116 can generate a notification for the client devices 106 on the subnet 120 that informs the client devices 106 of the local IP address of the new master device. As the newly appointed master device, the client device 207 can receive the notification or a command for the other client devices 106 to perform a check-in and communicate one or both to the notification server 147 of the client devices 209 and 211. For example, the client device 207 can broadcast a message to the entire subnet 120 informing the subnet 120 of the change in master device.

Alternatively, the client devices 209 and 211, assuming neither leaves the subnet 120, will also at some point poll the previous master client device 206 according to their respective polling frequencies and then communicate with the management service 116 to request to be appointed as the new master. Because a new master has already been appointed, the management service 116 can respond to the client devices 209 and 211 with the local IP address of the new master device, client device 207. In either scenario, client devices 209 and 211 can begin polling the new master device according to their respective polling frequencies. In some examples, a new polling frequency can be generated by the management service 116 or management component 145 after appointment of the new master device.

Figure 4:
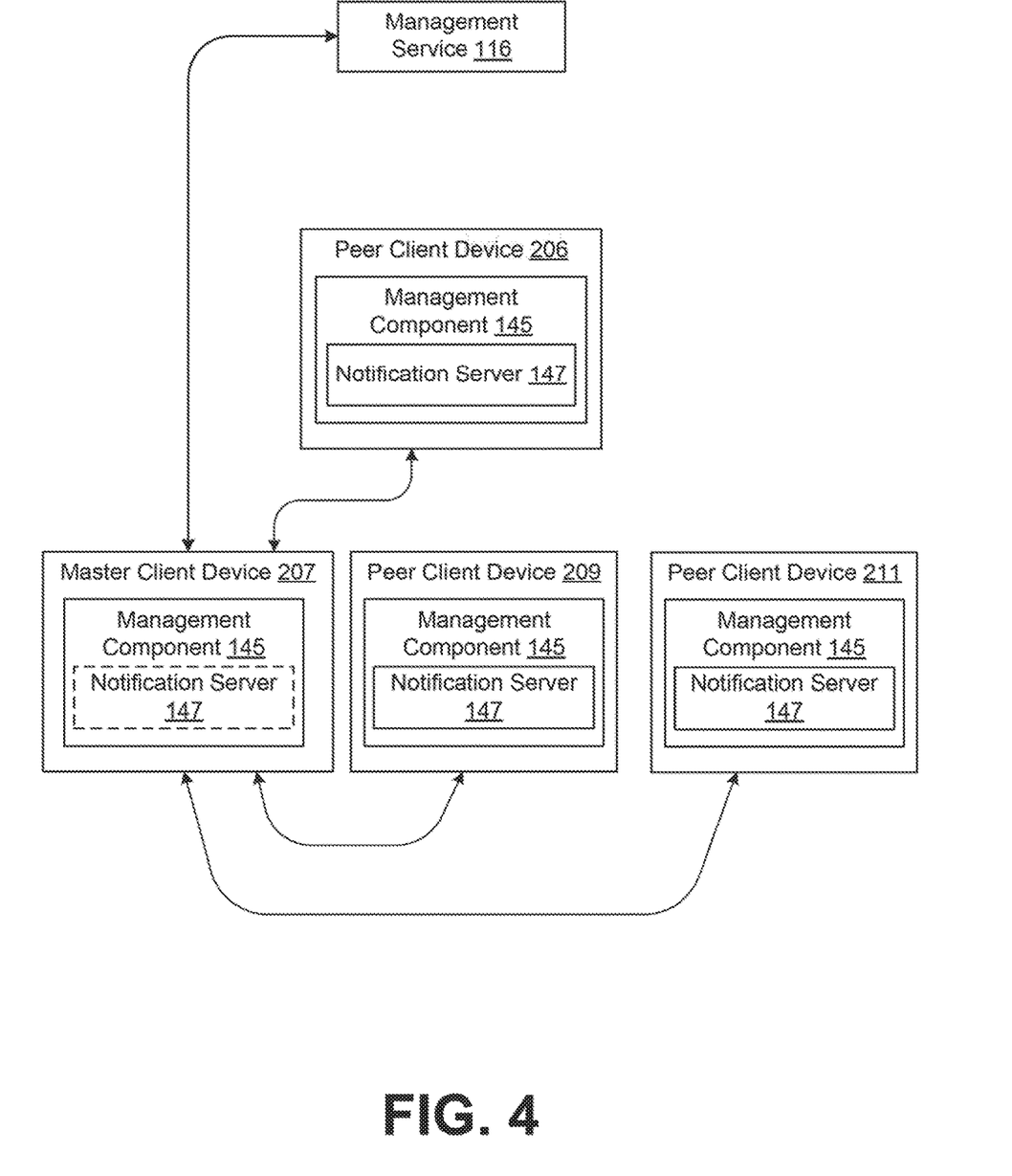
FIG. 4 is a block diagram illustrating an example scenario according to examples of the disclosure.

Continuing the example of FIG. 3, reference is now made to FIG. 4. As shown in FIG. 4, client device 206, which was previously the master device in the scenario of FIG. 2, has returned to the subnet 120. Its return to the subnet 120 can be made after it relocates back to the subnet 120, restarts, or its network connectivity to the subnet 120 is restored. Accordingly, the client device 206, upon detecting a network change, can communicate with the management service 116 to perform a check-in and obtain information about a distributed notification grouping from the management service 116, if there is one. It should be noted that the management service 116 avoid creating a distributed notification grouping for a subnet 120 or public IP address provided by one or more client devices 106 and that creating a grouping does not necessarily occur for all subnets 120.

Despite being previously being appointed as the master device for the subnet 120, the management service 116 can determine from the subnet table 127 for the subnet 120 that a current master device exists and command the client device 206 to act as a peer or slave device. The management service 116 can also provide the local IP address of the master client device 207 so that the client device 206 can periodically poll the client device 207. The client device 206 can also activate its notification server 147 to receive notifications or commands to perform check-ins with the management service 116 from the current master device.

Figure 5:
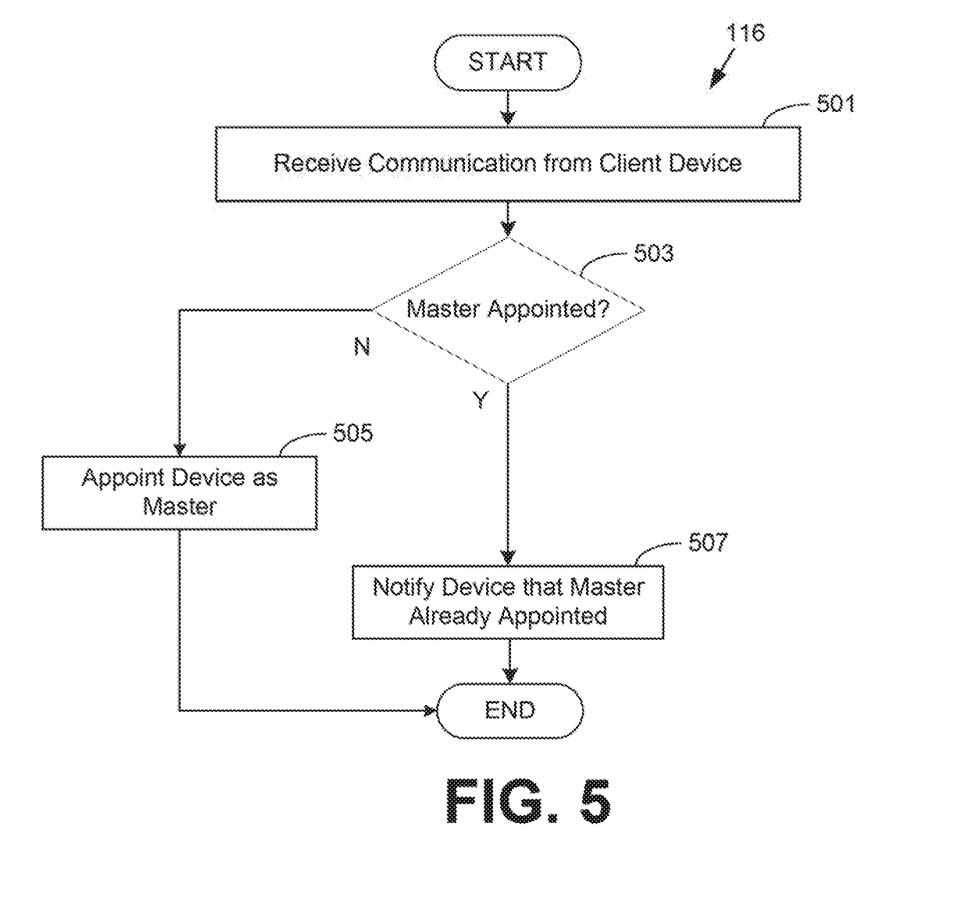
FIG. 5 is a flowchart that illustrates an example method according to examples of the disclosure.

Reference is made to FIG. 5, which is a flowchart that illustrates an example method of how the management service 116 can appoint a master device in a distributed notification grouping according to examples of the disclosure.

Beginning at step 501, the management service 116 executing in the computing environment 102 can receive a communication from a client device 106. The communication can be a device check-in that the client device 106 can perform after detecting a network change. A network change can occur upon startup or when an IP address of the client device 106 changes. The check-in can be performed to determine whether a distributed network grouping for the client device 106 has been created and receive information about the grouping. The device check-in can include information about the client device 106, such as a subnet address, a local IP address, a device identifier, and a public IP address of the client device 106.

At step 503, the management service 116 can determine whether a distributed notification grouping exists that corresponds to the public IP 129 and the subnet address 131 provided by the client device at step 501. The management service 116 can make this determination based upon the subnet tables 127 that store information about the distributed notification groupings, such as the currently appointed master device and the other members of the grouping. If a distributed notification grouping already exists, the process can proceed to step 507. If no distributed notification grouping exists for the public IP 129 and subnet address 131, the process can proceed to step 505, where the client device 106 is appointed as the master device of the distributed notification grouping.

At step 505, again, the client device 106 is appointed as the master device for a distributed notification grouping that is either created by the management service 116 when the communication is received from the client device 106 or a previously created grouping. The management service 116 can update an entry subnet tables 127 corresponding to the public IP 129 and subnet address 131 with the local IP address of the client device 106 along with an indication that the client device 106 at this local IP address is the master device. A device identifier can also be stored along with the entry in the subnet tables 127. Accordingly, subsequent devices that join the subnet 120 and perform a device check-in can receive instructions that the client device 106 has been appointed as the master device for a distributed notification grouping on the subnet 120. After appointment of the client device 106 as the master device, the management component 145 on the client device 106 can periodically poll the management service 116 for notifications for itself and for other peer or slave devices that are in the notification grouping. Thereafter, the process proceeds to completion.

If the process proceeded from step 503 to step 507, the management service 116 can respond to the client device 106 with information about the already appointed master device for a previously created notification grouping for the subnet 120. The information can include a local IP address of the master device as well as a polling frequency or seed value from which the client device 106 can generate the polling frequency. As noted above, the polling frequency represents a frequency with which peer or slave devices can poll the master device for a notification grouping to test whether the master device is still a member of the subnet 120. Thereafter, the process proceeds to completion.

Figure 6:
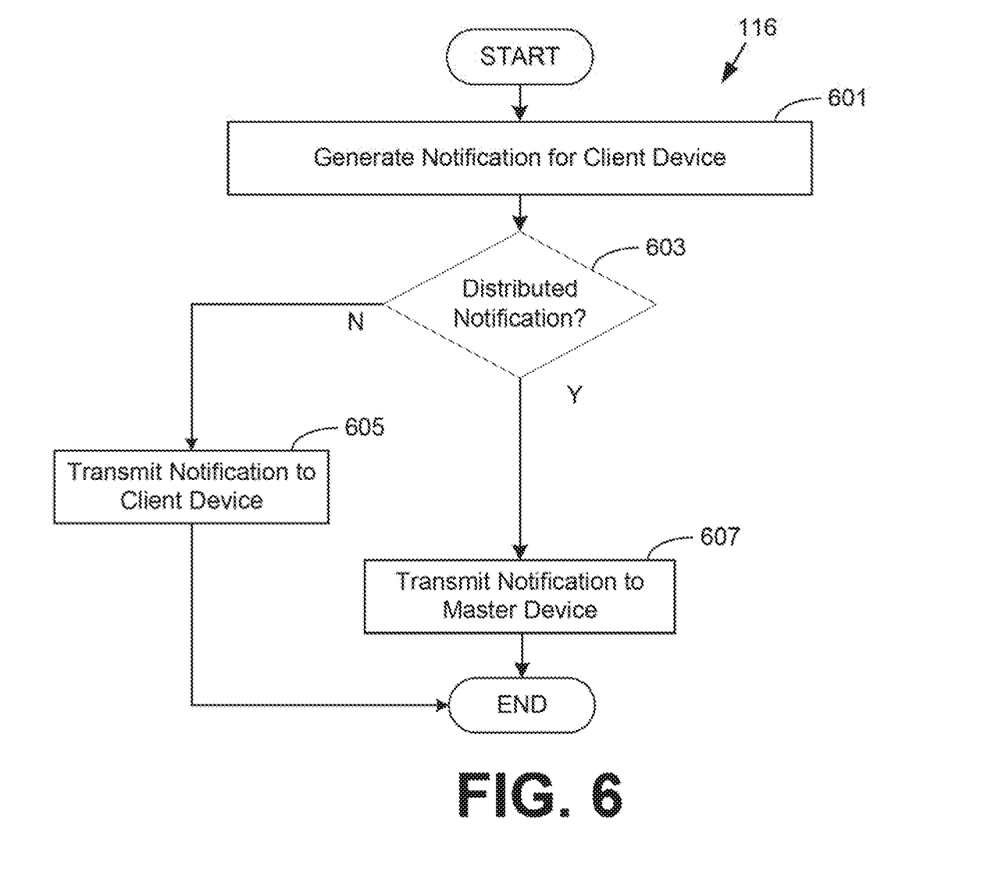
FIG. 6 is a flowchart that illustrates an example method according to examples of the disclosure.

Reference is made to FIG. 6, which is a flowchart that illustrates an example method of how the management service 116 can distribute a notification using the distributed notification grouping.

At step 601, the management service 116 can generate a notification for a client device 106. The notification can be an informational notification or a command that can be carried out by the management component 145 on the client device 106.

At step 603, the management service 116 can determine whether the notification should be sent using a distributed notification grouping. The management service 116 can consult the subnet tables 127 to determine whether a notification grouping exists for the client device 106. The subnet tables 127 can include a device identifier for the client device 106, so the management service 116 can search the subnet tables 127 using the device identifier. Additionally, the management service 116 can determine based on the operating system of the client device 106 that it is not a member of a distributed notification grouping.

In an alternative implementation, the subnet tables 127 can include a public IP and subnet address of the various devices that are in communication with the management service 116. The management service 116 can identify a distributed notification grouping based upon a hash of the public IP and subnet address to determine whether distributed notification is supported for a particular device or not.

If the client device 106 is not a member of a distributed notification grouping, the process can proceed to step 605. At step 605, the management service 116 can distribute the notification to the client device 106 without using a distributed notification grouping. Distributing the notification to the client device 106 can be accomplished using an operating system API provided by an operating system or device ecosystem of the client device 106. In some cases, a customized notification framework can be utilized that does not rely upon a distributed notification grouping.

In this scenario, the client device 106 can also effectively be the master device in a single device distributed notification grouping. The management service 116 can appoint the client device 106 as the master device until another client device 106 happens to join the same subnet as the client device 106, in which case, the other client device 106 will be a slave or peer device. In a single device distributed notification grouping, the management service 116 can add an entry to the subnet tables 127 for the client device 106 and avoid going through a separate flow for distributed notification groupings.

If the client device 106 is a member of a distributed notification grouping with other client devices 106, the process can proceed to step 607 from step 603. At step 607, the management service 116 can provide the notification or the command to perform a check-in with the management service 116 to the master device. The management service 116 can provide the local IP address of the client device 106 for which the notification is intended.

The master device can then provide the notification or the command to perform a check-in with the management service 116 to the notification server 147 at the local IP address of the client device 106 for which the notification is intended. Once the notification server 147 receives the command to perform a check-in with the management service 116 or the notification data itself, the management component 145 can act on the command or notification. In the case of a command to perform a check-in, the management component 145 can communicate directly with the management service 116 to obtain the notification to which it was alerted by the master device. Thereafter, the process proceeds to completion.

Figure 7:
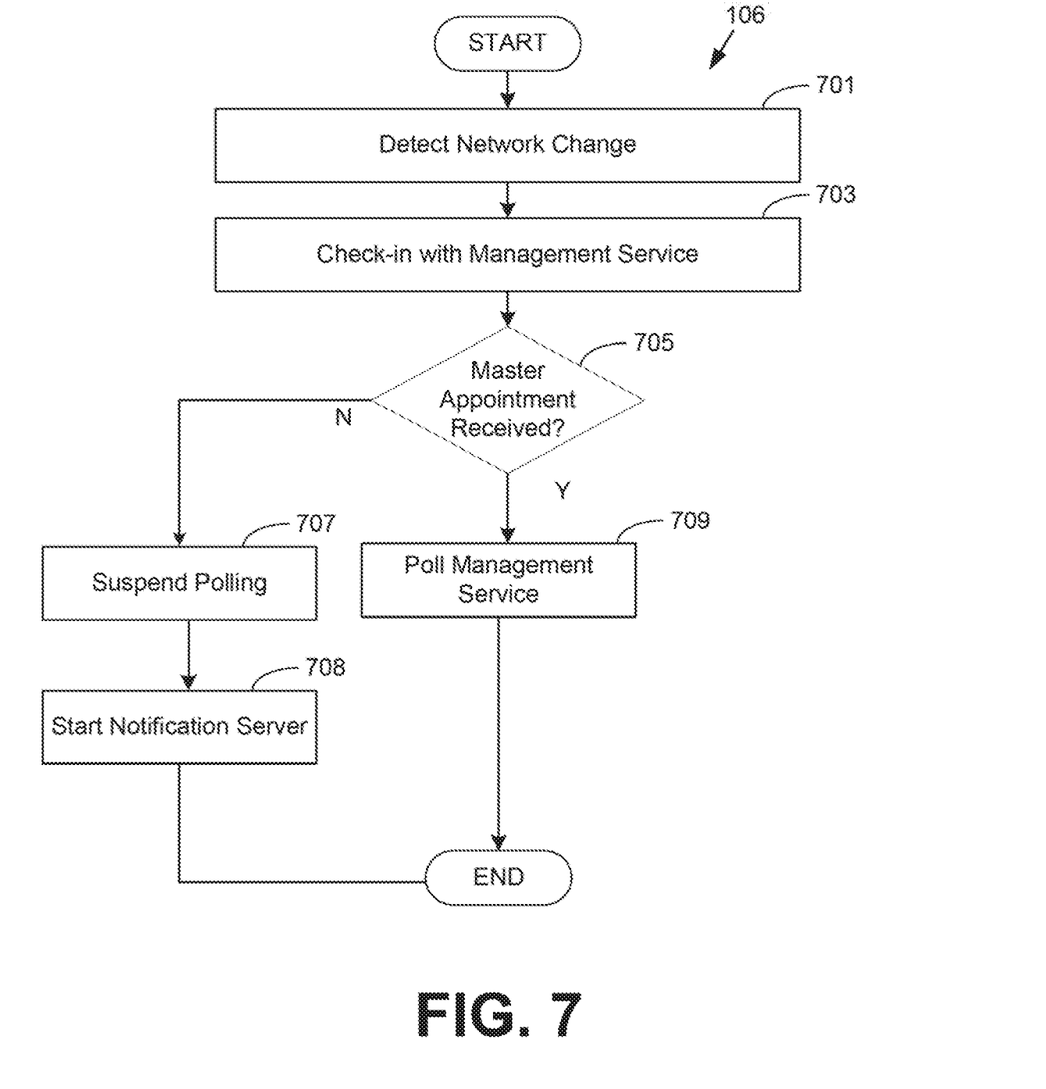
FIG. 7 is a flowchart that illustrates an example method according to examples of the disclosure.

Reference is made to FIG. 7, which is a flowchart that illustrates an example method of how the client device 106 and the management component 145 can join a network and receive notifications from the management service 116 or a server implementing the distributed notifications scheme according to examples of the disclosure.

At step 701, the client device 106 can detect a network change. A network change can be a change in IP address or any other change in connectivity status, such as a start-up or reset of the client device 106. When a network change occurs, this can be an indication that the subnet 120 or network 119 to which the client device 106 is connected may have changed.

At step 703, after the network change, the management component 145 can perform a check-in with the management service 116. The client device 106 can perform a device check-in to retrieve information about a distributed notification group to which the client device 106 should be assigned, if any.

At step 705, in response to performing the device check-in, the client device 106 can determine based on information received from the management service 116 whether it is the master device of a distributed notification grouping. If the management service 116 appoints the client device 106 as the master device, the process proceeds to step 709, where it polls the management service 116 periodically or even frequently to obtain notifications for itself or on behalf of other peer or slave devices in the distributed notifications grouping.

If the management service 116 does not appoint the client device 106 as the master, the process proceeds to step 707. At step 707, the management component 145 suspends polling of the management service 116. Polling can be suspended because notifications or commands to retrieve notifications from the management service 116 are received from the master device on behalf of the management service 116.

At step 708, the management component 145 can execute a notification server 147, which is a server process that listens on a specified port for notifications or commands to perform a device check-in with the management service 116 from the master device. In one example, the notifications or commands to perform a device check-in can be signed with a certificate of the management service 116 so that the management component 145 can verify the authenticity of the notification or command. Thereafter, the process can proceed to completion.

Figure 8:
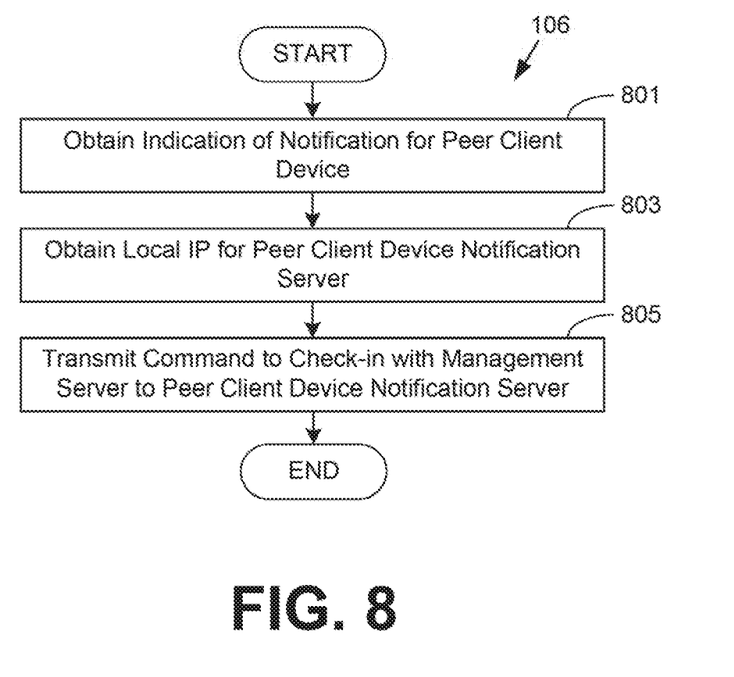
FIG. 8 is a flowchart that illustrates an example method according to examples of the disclosure.

Reference is made to FIG. 8, which is a flowchart that illustrates an example method of how the client device 106 and the management component 145 can act as a master device for a distributed notification grouping on behalf of the management service 116 or a server implementing the distributed notifications scheme according to examples of the disclosure. The flowchart of FIG. 8 assumes that the client device 106 has been previously appointed as the master device for a distributed notification grouping.

At step 801, the management component 145 can obtain an indication from the management service 145 of a notification for a peer device within the notification grouping for which the client device 106 running the management component 145 is the master device. The indication can include a local IP address of the peer device. The indication can include the notification itself or a command for the peer device to perform a device check-in with the management service 116 to retrieve its notifications.

At step 803, the management component 145 acting as the master of the distributed notification grouping can obtain the local IP address of the peer device for which the notification is intended. The indication received from the management service 116 at step 801 can include a local IP address of the peer device.

At step 805, the management component 145 can provide the notification or check-in command to the notification server 147 of the peer client device. Again, the notification server 147 represents a server process that can be executed on the client device 106. The notification server 147 can be executed by client devices 106 that are not appointed as a master client device 106 for a subnet 120. The notification server 147 can listen on a port and local IP of the client device 106 for a command from the appointed master device to request a notification from the management service 116. Thereafter, the process proceeds to completion.

The flowcharts of FIGS. 5-8 show examples of the functionality and operation of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

Although the flowchart and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The various components described herein can include at least one processing circuit, where such a processing circuit can include, for example, one or more processors and one or more storage devices that are coupled to a local interface. The local interface can include, for example, a data bus with an accompanying address/control bus or any other suitable bus structure.

The various components described herein can be embodied in the form of hardware, as software components that are executable by hardware, or as a combination of software and hardware. If embodied as hardware, the components described herein can be implemented as a circuit or state machine that employs any suitable hardware technology.

One or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

The above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

What is claimed is:

1. A method for distributed notifications within a grouping of client devices, the method comprising:
   receiving a first communication from a first client device in a server configured to transmit notifications to a population of devices, the first communication comprising a subnet address of the first client device, the first communication being associated with a first public IP address of the first client device;
   determining based on the communication that the first client device should be assigned as a master device for a distributed push notification grouping for the subnet address and the first public IP address;
   transmitting a first response to the first client device appointing the first client device as the master device, wherein the master device is configured to periodically poll the server for at least one indication to retrieve a notification from the server or to notify a peer device to retrieve a notification from the server;
   receiving a second communication from a second client device in the server, the second communication comprising the subnet address and a second public IP address of the second client device;
   transmitting a second response to the second client device that informs the second client device that the first client device is the master device, the second response comprising a first local IP address of the first client device, wherein the second client device suspends polling of the server and initiates a notification server process on a specified port;
   generating a second notification for the second client device;
   receiving a second polling request from the first client device;
   providing a command to the first client device that the second client device should retrieve the second notification from the server, the command comprising a second local IP address of the second client device, wherein the first client device transmits an indication based on the command to the notification server process at the specified port of the second client device at the second local IP address.

2. The method of claim 1, further comprising:
   generating a first notification for the first client device;
   receiving a first polling request from the first client device; and
   providing the first notification to the first client device in response to the polling request.

3. The method of claim 1, wherein the second response comprises a seed value, the second client device polling the master client device at an interval based upon the seed value.

4. The method of claim 1, wherein the distributed push notification grouping comprises a plurality of client devices, and the method further comprises:
   receiving a third communication from a third client device to replace the master device, wherein the third client device discovered that the first client device is inaccessible by polling the master client device; and
   transmitting a third response to the third client device appointing the third client device as the master device for the distributed push notification grouping.

5. The method of claim 4, wherein the third client device broadcasts a message to the subnet address to inform the distributed push notification grouping that third client device has assumed the role of the master device.

6. The method of claim 1, wherein the first public IP address and the second public IP address are the same IP address, and the method further comprises:
   storing the first local IP address and a first device identifier for the first client device in a data structure keyed by the subnet address and the first public IP address; and
   storing the second local IP address and a second device identifier for the second client device in the data structure.

7. A system for distributed notifications within a grouping of client devices comprising:
   at least one computing device; and
   at least one application executed by the at least one computing device, the at least one application causing the at least one computing device to at least:
      receive a first communication from a first client device in a server configured to transmit notifications to a population of devices, the first communication comprising a subnet address of the first client device, the first communication being associated with a first public IP address of the first client device;
      determine based on the communication that the first client device should be assigned as a master device for a distributed push notification grouping for the subnet address;
      transmit a first response to the first client device appointing the first client device as the master device, wherein the master device is configured to periodically poll the server for at least one indication to retrieve a notification from the server or to notify a peer device to retrieve a notification from the server;
      receive a second communication from a second client device in the server, the second communication comprising the subnet address and a second public IP address of the second client device;
      transmit a second response to the second client device that informs the second client device that the first client device is the master device, the second response comprising a first local IP address of the first client device, wherein the second client device suspends polling of the server and initiates a notification server process on a specified port;
      generate a second notification for the second client device;
      receive a second polling request from the first client device; and
      provide a command to the first client device that the second client device should retrieve the second notification from the server, the command comprising a second local IP address of the second client device, wherein the first client device transmits an indication based on the command to the notification server process at the specified port of the second client device at the second local IP address.

8. The system of claim 7, wherein the at least one application causes the at least one computing device to at least:
   generate a first notification for the first client device;
   receive a first polling request from the first client device; and
   provide the first notification to the first client device in response to the polling request.

9. The system of claim 7, wherein the second response comprises a seed value, the second client device polling the master client device at an interval based upon the seed value.

10. The system of claim 7, wherein the distributed push notification grouping comprises a plurality of client devices, and the at least one application causes the at least one computing device to at least:

receive a third communication from a third client device to replace the master device, wherein the third client device discovered that the first client device is inaccessible by polling the master client device; and transmit a third response to the third client device appointing the third client device as the master device for the distributed push notification grouping.

11. The system of claim 7, wherein the first public IP address and the second public IP address are the same IP address, and the at least one application causes the at least one computing device to at least:

store the first local IP address and a first device identifier for the first client device in a data structure keyed by the subnet address and the first public IP address; and store the second local IP address and a second device identifier for the second client device in the data structure.

12. A non-transitory computer-readable medium storing a plurality of computer instructions executable by a computing device, wherein the plurality of computer instructions cause the computing device to at least:

receive a first communication from a first client device in a server configured to transmit notifications to a population of devices, the first communication comprising a subnet address of the first client device, the first communication being associated with a first public IP address of the first client device;

determine based on the communication that the first client device should be assigned as a master device for a distributed push notification grouping for the subnet address;

transmit a first response to the first client device appointing the first client device as the master device, wherein the master device is configured to periodically poll the server for at least one indication to retrieve a notification from the server or to notify a peer device to retrieve a notification from the server;

receive a second communication from a second client device in the server, the second communication comprising the subnet address and a second public IP address of the second client device;

transmit a second response to the second client device that informs the second client device that the first client device is the master device, the second response comprising a first local IP address of the first client device, wherein the second client device suspends polling of the server and initiates a notification server process on a specified port;

generate a second notification for the second client device;

receive a second polling request from the first client device; and provide a command to the first client device that the second client device should retrieve the second notification from the server, the command comprising a second local IP address of the second client device, wherein the first client device transmits an indication based on the command to the notification server process at the specified port of the second client device at the second local IP address.

13. The non-transitory computer-readable medium of claim 12, wherein the computer instructions cause the computing device to at least:

generate a first notification for the first client device;

receive a first polling request from the first client device; and provide the first notification to the first client device in response to the polling request.

14. The non-transitory computer-readable medium of claim 12, wherein the second response comprises a seed value, the second client device polling the master client device at an interval based upon the seed value.

15. The non-transitory computer-readable medium of claim 12, wherein the distributed push notification grouping comprises a plurality of client devices, and the computer instructions cause the computing device to at least:

receive a third communication from a third client device to replace the master device, wherein the third client device discovered that the first client device is inaccessible by polling the master client device; and transmit a third response to the third client device appointing the third client device as the master device for the distributed push notification grouping.

16. The non-transitory computer-readable medium of claim 12, wherein the first public IP address and the second public IP address are the same IP address, and the computer instructions cause the computing device to at least:

store the first local IP address and a first device identifier for the first client device in a data structure keyed by the subnet address and the first public IP address; and store the second local IP address and a second device identifier for the second client device in the data structure.

* * * * *